Sept. 27, 1955 S. STEUERMAN 2,719,029
STORING AND COMPACTING OF GRANULAR MATERIALS IN
SHIPS' HOLDS, RAILWAY CARS, SILOS AND THE LIKE
Filed Jan. 28, 1954
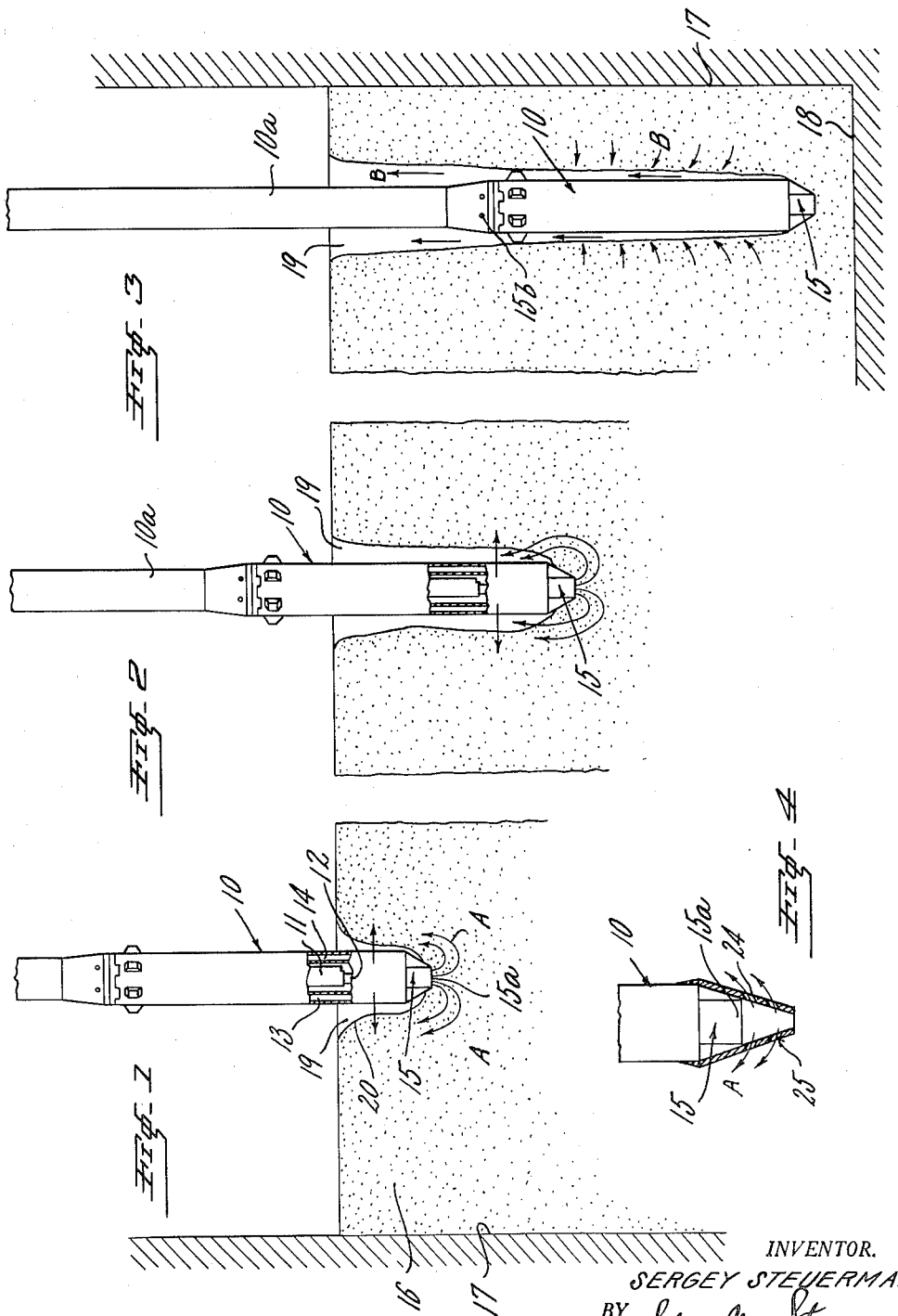
INVENTOR.
SERGEY STEUERMAN
BY

United States Patent Office 2,719,029
Patented Sept. 27, 1955

2,719,029

STORING AND COMPACTING OF GRANULAR MATERIALS IN SHIPS' HOLDS, RAILWAY CARS, SILOS, AND THE LIKE

Sergey Steuerman, New York, N. Y.

Application January 28, 1954, Serial No. 406,873

10 Claims. (Cl. 259—1)

The present invention refers to the storing and compacting of granular materials in bulk, in particular, of granular materials of extreme fineness.

It is one of the primary objects of this invention to provide means facilitating compaction of powdery or other fine granular materials in bulk within a receptacle, such as ships' holds, railway cars, silos, and similar storage and transportation receptacles.

It is another object of the present invention to provide means affording the storage of granular materials of extreme fineness in bulk whereby such material takes up a minimum of space and may be compacted within the shortest time possible.

Yet another object of the present invention is to provide means conducive to a highly economical process of storing and compacting granular materials in powder form whereby such materials occupy a predetermined storage space and to the full given volume thereof.

Still another object of the present invention is to provide means rendering the possibility of storing fine granular materials in bulk substantially with or without changing any of the physical properties of said materials during introduction of the same into, as well as during compaction within the confines of a given storage space.

It is still another object of the present invention to provide means reducing air friction between particles or granules of the material to a minimum, whereby consolidation and compaction of the material are greatly enhanced.

Yet another object of the present invention is to provide means rendering the possibility of compacting fine granular material in bulk while simultaneously changing its chemical properties in order to enhance the compaction effect.

It is still another object of the present invention to provide means affording compaction of granular material in situ whereby the material under treatment may be subjected to changes with respect to chemical and/or physical properties thereof.

A still further object of the present invention is to provide means redounding to effective compaction of fine granular material from which air will be removed for escape through a funnel, which is created during the compaction process and which serves also the purpose of directing additional material to the location where compaction takes place.

Still another object of the present invention is to provide means affording increased versatility of improved vibrator structures, whereby same may be converted from a device permitting passage of liquid therethrough to a device for positively directing and guiding gas or gases to locations where compaction of granular material is to be performed, either in situ or in large storage receptacles.

These and other objects of the invention will be pointed out in the following description and claims and in the accompanying drawing, which discloses by way of example the principle of the invention and preferred modes which have been contemplated in applying said principle.

In the drawing:

Fig. 1 illustrates schematically a device made in accordance with the invention (partly shown in section) and in the stage of initially compacting stacked powdery, fine, granular material;

Fig. 2 shows the device of Fig. 1 in a progressed stage;

Fig. 3 shows the device of Fig. 1 adjacent the bottom of said stacked material and while the latter is being compacted.

Fig. 4 is a fragmentary view of the forward end or head of a vibrator convertible to direct gas in predetermined direction.

Referring now more particularly to the drawing, there is shown in Fig. 1 a compacting device 10 of any known structure in which an eccentric weight 11 is power driven about a shaft 12, as shown. The device 10 further encloses tubular or hose means 13, 14 from which compressed air is discharged at the forward end 15 of the device. Hoses 13 and 14 may be connected to a separate and regulatable air compressor (not shown) of any known structure and suitably connected to the device 10. The material here assumed is powdery fine granular material in bulk 16 which is, for instance, stacked or stored in a ship's hold 17 having a bottom wall 18.

In order to adequately compact the powdery fine material in the ship's hold and to thus reduce the volume of the material in said hold, certain steps are taken in accordance with the present invention.

One the one hand it is to be observed that air contained in the granular material to be compacted must be liberated so that said air may escape and to that effect the air friction between the granules of the material will be changed from static to a smaller aero-dynamic friction.

It has further been found that vibrations produce a higher degree of compaction of the granular material with surcharge, but vibrations are easily absorbed by the loose granular material.

Under these circumstances the compaction of large masses of granular material stacked in a ship's hold, for instance, requires internal vibrations which have to be applied successively to various parts of the granular material.

To this end it is required that vibratory means in the form of a vibrator device 10 as shown in Figs. 1, 2, and 3 is suitably introduced into the deepest layer or location of the material 16 and to provide a short escape path for the air to be pressed from the granular material during compaction thereof.

According to the invention it has been found that the introduction or sinking of the vibrator device 10 into a predetermined area of the fine granular material may be brought about under simultaneous injection of a suitable gas, such as air, and under predetermined pressure into said area of said material, whereby the gas is introduced into the latter below the forward end or tip 15 of the vibrator and preferably from nozzles 15a thereof.

Gas as indicated by the arrows A introduced under pressure below or in tandem relation to the vibrator tends to move upward and brings the powdery fine material into a quick state below and around the vibrator, whereby the friction between the gas and the granular material is reduced to a minimum.

The centrifugal force of the vibrations further forces the material changed into quick state toward the wall defining a funnel 19 and created around the penetrating vibrator, whereby the material forming wall 20 of the funnel 19 is suitably precompacted.

This funnel and the quick state of the material under the tip of the vibrator facilitate the downward movement of the vibrator while the funnel provides a short escape path for air pressed or squeezed out from between the granules of the material during the ensuing compaction thereof.

In order to proceed with the compaction in accordance with the process of the invention, any suitable gas, such as air, steam (preferably superheated steam) or an inert gas may be employed. When such gas escapes at the forward end or vibrator head 15 through nozzles 15a, the vibrator due to its own weight and opening-up of the funnel 19 by the effect of the compressed gas moves downwardly into the material until it and a follow-up pipe 10a reach a certain depth in funnel 19.

As soon as the vibrator 10 has reached approximately the bottom 13 of the ship's hold, a valve (not shown) for regulating the flow or stream of the gas to the nozzles 15a is closed and the vibrator transmits its vibrations to its surrounding granular materials adjacent the bottom of the funnel. This funnel will be during compaction steps at least partly filled with the same granular material which will be (during the withdrawal of the vibrator device 10 from the lower part or bottom of the funnel) sufficiently compacted, whereby air is pressed out from the interstices between granules of the surrounding material for escape into and out of the funnel (see arrows B of Fig. 3).

The vibrator is then further withdrawn from within the funnel 19, step by step, while still further granular material will be added or supplied to the funnel from above and to locations adjacent the vibrator. If the withdrawal of the vibrator step by step or from one layer or location to another layer or location (as, for example, from a position of Fig. 3 to a position of Fig. 2 and further from a position of Fig. 2 to a position of Fig. 1) encounters any difficulties, then compressed gas may be introduced into the funnel 19 from upper nozzle means 15b of the vibrator 10, so that the material within the funnel will be suitably influenced to afford smooth retraction of the vibrator. The compressed gas, in this latter case, will have the tendency to pass through still less compacted material within the funnel and will thus aid in the retraction of the vibrator.

The aforesaid compaction stages are repeated at adjacent locations (one after another), and it will be readily apparent that a thorough compaction of the stacked material will be achieved.

The following example is given to illustrate the compaction process with a suitably stacked material.

Let it be assumed that alumina powder is to be compacted in the aforesaid manner and without subjecting same to changes of its properties.

This alumina powder employed contained grains, 50% of which pass through a 200 mesh sieve and its normal cubic foot weight is assumed to be approximately 58 lbs. Such small volume weight does not permit the use of the ship tonnage in a best possible economical manner. If during transportation the ship rolls heavily and if alumina would be loose or only brought to relatively small dense state (through vibrations of the ship's engines and pumps), the alumina powder would nevertheless slide from side to side in the hold of the ship, which would considerably endanger the stability of the ship. Such state may be effectively avoided and economically increased ship space utilization will be accomplished according to the invention.

In order to precompact this alumina powder within the ship's hold and in accordance with the process of the present invention, dry compressed air of approximately 50 p. s. i. was employed as a gas while further alumina powder was used to fill the funnel created when the vibrator was introduced into said alumina material.

The electric motor-driven vibrator employed had a diameter of 15 inches and a length of about 6 feet. The vibrator was allowed to sink under its own weight as far as possible, amounting to approximately 12 to 18 inches, into the loose and stacked alumina. Compressed air was then turned on and vibrations were started so that the vibrator device sunk further to a depth of about 9 to 10 feet. A relatively low air pressure of approximately 50 p. s. i. was maintained during this penetration. The supply of air was shut off during the ensuing compaction steps.

The vibrator was allowed to operate first at the funnel bottom of the alumina until this material was adequately compacted. Then the vibrator device was raised while the alumina was still further under treatment of compaction, to about 2 feet. Achievement of maximum material density at any stage during the compaction was determined by the power input to the electric motor. As the alumina became denser and more compact, the resistance to movement of the vibrator became greater and therefore the power input was increased during continued compaction. An ammeter recorded motor power input variations and the vibrator was retracted to the next step or layer when the ammeter registered peak resistance. The interval of time for a 10-foot compaction was approximately 3 minutes.

A reduction in the volume of the voids from .722 to .636 cubic feet is sufficient to change the alumina from its loosest to its densest state. This is a volume reduction of 8.6%. The percentage increase in weight per cubic foot is 23.3%. Consequently one cubic foot of loose alumina will occupy 1.305 cubic feet, the volume occupied by the compacted alumina particles being .364 cubic feet. This means that in the loose stage the voids take up .941 cubic feet; after compaction, the space of the voids is reduced to .636 cubic feet. This means a change in voids of .305 cubic feet.

The average settlement of alumina was .95 feet or about 10% of the original depth of the alumina deposit in the hold. This percentage is in fair agreement with the calculated value of 8.6% based on constant volume and 23.3% based on constant weight.

If the compaction would be effectuated with no added material (constant weight), the reduction in height of the original depth of the alumina deposit would be 16% (this percentage is 75% of the ratio of the change in voids to the original volume, which is 23%).

Experience indicates that a granular material with a relative density of 70% or greater, is stable and able to resist oscillatory motions. Consequently, vibrations from engine motors and pumps would not be strong enough to shake the powdery alumina material to a density greater than 70%. Because of the good interlocking characteristics of the alumina particles the increase in resistance is consistent with the increase in density from an average 63 p. c. f. before compaction to 76 p. c. f. after compaction.

The tests conducted on the alumina clearly indicate that a considerable reduction in volume of loose alumina can be effected with the vibrations by means of the vibrator hereinabove indicated. A reduction in depth of deposit of alumina of 10% was observed, and it was found that the cubic foot weight of the alumina powder in the ship's hold can thus be increased to about 72 lbs.

The aforesaid example clearly shows the effectiveness of the combination gas and vibration treatment of fine granular masses, whether they are to be compacted and stored in a receptacle or not. The vibrator used for such process may preferably be provided with a hollow cap 25 having suitable perforations 24 guiding the discharged gas streams from the nozzle means 15a in upward direction as indicated (Fig. 4).

When the physical and chemical properties of the material to be compacted are not to be changed during the compaction process, it is preferred to use a gas which does not react with the material. If, however, a change of the chemical properteis of the material under treatment is required, such as, for instance, when using loess, a gaseous medium, such as steam changing the properties of loess may be employed during the compaction of the material.

It is further contemplated according to the present invention to change the physical properties of the material under treatment or at least part of the same by using as a filling material or as an additional material for the funnel a material similar to that under treatment but of completely different granular size or composure.

A change of the material properties is usually not contemplated when the compaction of the material is applied for storing or transporting the same, while changes in the chemical and/or physical properties may be applied either to bring about a better compaction of the powdery fine granular material in situ or otherwise.

As example for the compaction of powdery, fine material while simultaneously changing its chemical and physical properties may serve the compaction of loess. Loess is known to be a very treacherous soil formation which loses its bearing capacity and settles considerably when water is enclosed therein.

The compaction of silt by vibrations proved until now impossible due to the fact that the fine loess grains stick or are adhesively connected together through gypsum or calcium carbonate.

According to the invention loess may be compacted with the use of superheated steam or wet steam under pressure which dissolves the adhesive faculties of the gypsum or calcium carbonate during the resulting compaction. For the fill-in or additional material either loess or sand may be supplied, whereby the latter will enhance the bearing capacity of the loess.

It can thus be seen that there has been provided a new process for compacting especially fine, powdery, granular stacked material in situ and or in a ship's hold or like receptacle, which process includes the steps of introducing vibratory means into a predetermined area of said material and to the deepest location thereof to thereby create vibrations therein, and simultaneously directing a stream of compressed gaseous medium to said location, whereby said material is displaced in a funnel-shaped manner and precompacted around the wall defining said funnel, thereafter shutting off said stream of gaseous medium, adding to the interior of said funnel granular material, then continuing such vibrations to said added material at said deepest location, to thereby compact said added material and stacked material adjacent said deepest location of the area, thereafter moving said vibratory means to another location of said added material above said first named location to impart said vibrations to and to finally compact said added material and stacked material within said funnel and lengthwise thereof, and repeating said steps successively at an area adjacent said predetermined area, to thereby obtain a reduction in height of the stacked granular material and maximum density.

The invention has been shown in the drawing and described in general; however, it should be noted that this invention may be realized in modified form and adaptations of the arrangement and steps herein disclosed may be made as may readily occur to persons skilled in the art, without constituting a departure from the spirit and the scope of the invention as defined in the objects and in the appended claims.

Having thus described the invention, what is claimed as new and desired to be secured by Letters Patent is:

1. The process of reducing to a minimum the total volume of loose granular material stored within a ship's hold and like confines; the steps of subjecting said material to the action of vibratory means, advancing said vibratory means in said material to a predetermined depth, while simultaneously discharging a gaseous medium under pressure at the advancing end of said vibratory means, whereby said material is precompacted and a funnel is formed around said vibratory means, adding to said funnel further granular material, then slowly and stepwisely withdrawing said vibratory means from within said funnel commensurate with resultant compaction of said added granular material, and shutting off said gaseous medium discharge during said withdrawal.

2. The process of reducing the total volume of stacked granular material of great fineness to a minimum within a ship's hold and like confines; the steps of introducing into said stacked material vibratory means, advancing said vibratory means into said material to a predetermined depth, while simultaneously discharging gaseous fluid under pressure at the advancing end of said vibratory means, to thereby lower said vibratory means to predetermined depth and forming a funnel around said vibratory means, then adding to said funnel granular material of the same fineness as that of said stacked material, then withdrawing said vibratory means step by step from within said funnel commensurate with resultant compaction of said added granular material therein, and shutting off said gaseous fluid discharge during said withdrawal.

3. The process according to claim 2, wherein said gaseous fluid is compressed air, which leaves the physical properties of said granular material substantially unchanged.

4. The process of reducing the total volume of fine granular material to a minimum within a ship's hold and like receptacle; the steps of subjecting said material to the action of vibratory means, advancing said vibratory means in said material to a predetermined depth, simultaneously discharging gaseous fluid at the advancing end of said vibratory means, whereby said material is precompacted and a funnel is formed in said material and around said vibratory means, adding to said funnel granular material of different size of granules, shutting off said fluid discharge, and then stepwisely withdrawing said vibratory means from within said funnel upon compaction of said added granular material therein.

5. The process of reducing the total volume of stacked granular material of great fineness to a minimum; the steps of introducing into said stacked material vibratory means, advancing said vibratory means into said material while simultaneously discharging a compressed inert gaseous medium at the advancing end of said vibratory means, to thereby lower said vibratory means to predetermined depth and forming a funnel adjacent said advanced vibratory means, adding to said funnel granular material for bringing about infiltration of said added material into said stacked material, then withdrawing said vibratory means step by step from within said funnel upon compaction of said added granular material therein, and shutting off said gaseous medium discharge during said withdrawal.

6. The process according to claim 5, wherein said gaseous medium is water steam, said stacked granular material being loess.

7. The process according to claim 5, wherein said added granular material is of a fineness different from that of said stacked granular material.

8. The process according to claim 5, wherein said added granular material is alumina powder.

9. The process of reducing the total volume of stacked alumina material of great fineness to a minimum within a ship's hold and like receptacle; the steps of introducing into said material vibratory means, advancing said vibratory means into said stacked material to approximately the bottom thereof while simultaneously discharging compressed air from the advancing end of said vibratory means into said material, to thereby lower said vibratory means and forming a funnel adjacent said vibratory means, filling said funnel at least partly with further alumina material, while said compressed air is shut off, then withdrawing said vibratory means step by step from within said funnel upon compaction of said further alumina material therein.

10. The process of compacting granular material stacked within a ship's hold and like confines; the steps of introducing vibratory means into a predetermined area of said material and to the deepest location thereof to thereby create vibrations therein, and simultaneously directing a stream of compressed gaseous medium to said location, whereby said material is displaced in a funnel-shaped manner and precompacted around the wall defining said funnel, thereafter shutting off said stream of gaseous medium, adding to the interior of said funnel granular material, then continuing such vibrations to said added material at said deepest location, to thereby compact said added material and stacked material adjacent said deepest location of the area, thereafter moving said vibratory means to another location of said added material above said first named location to impart said vibrations to and to finally compact said added material and stacked material within said funnel and lengthwise thereof, and repeating said steps successively at an area adjacent said predetermined area, to thereby obtain a reduction in height of the stacked granular material and maximum material density.

References Cited in the file of this patent

UNITED STATES PATENTS

| | | |
|---|---|---|
| 2,360,803 | Steuerman | Oct. 17, 1944 |
| 2,607,569 | Pierre | Aug. 19, 1952 |
| 2,662,750 | Degen | Dec. 15, 1953 |
| 2,667,749 | Steuerman | Feb. 2, 1954 |